July 5, 1966   W. T. McWHIRTER   3,259,753
AUTOMATIC ENGINE STARTER
Filed Jan. 24, 1964   2 Sheets-Sheet 1

INVENTOR.
WAYNE T. McWHIRTER,
BY
McMorrow, Berman + Davidson
ATTORNEYS.

July 5, 1966 W. T. McWHIRTER 3,259,753
AUTOMATIC ENGINE STARTER
Filed Jan. 24, 1964 2 Sheets-Sheet 2
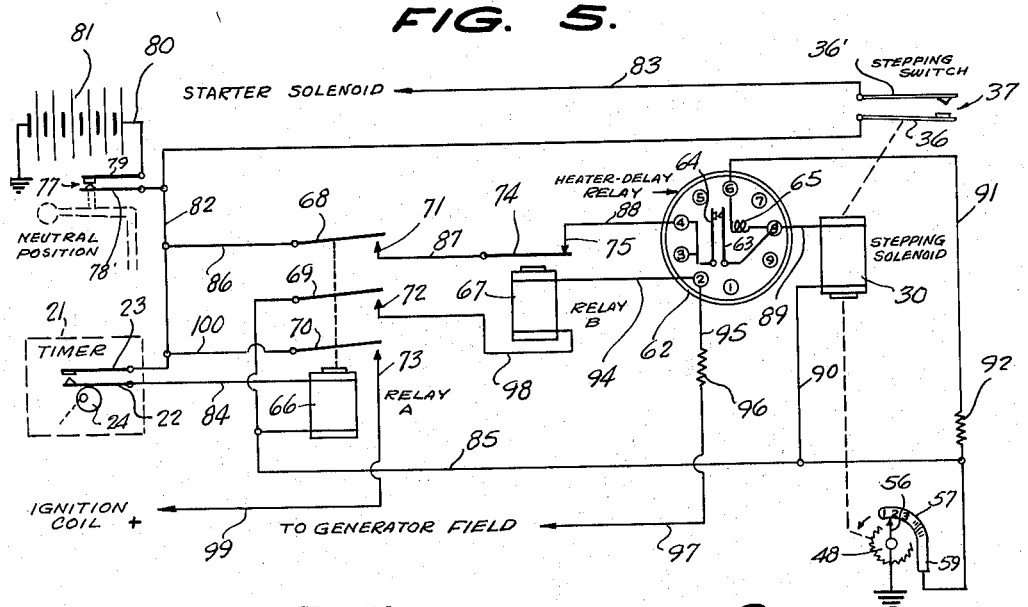
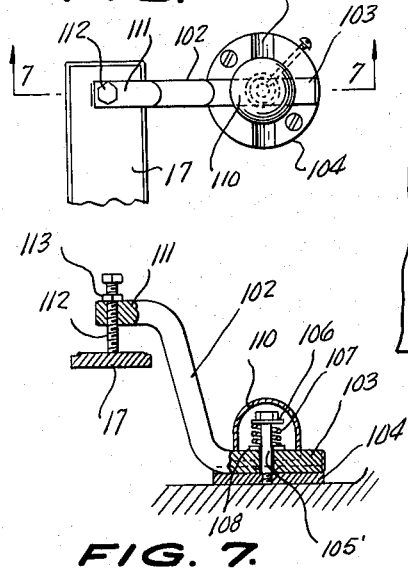
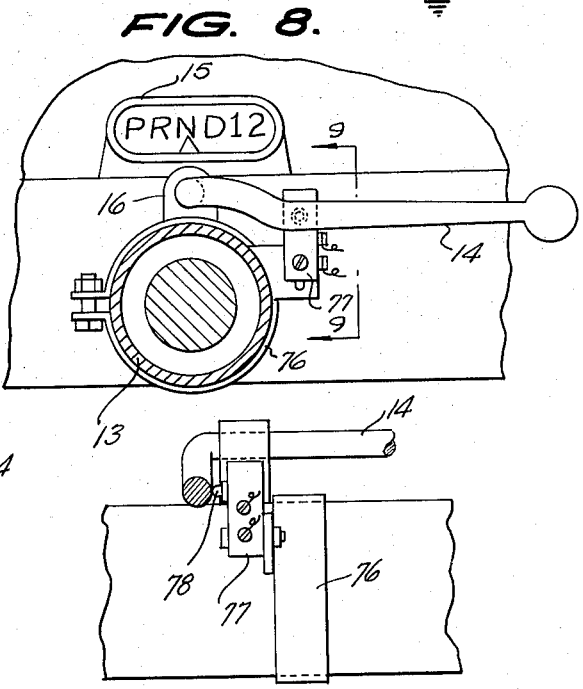
INVENTOR.
WAYNE T. McWHIRTER,
BY
McMorrow, Berman + Davidson
ATTORNEYS.

United States Patent Office 3,259,753
Patented July 5, 1966

3,259,753
AUTOMATIC ENGINE STARTER
Wayne T. McWhirter, P.O. Box 198, North Miami, Fla.
Filed Jan. 24, 1964, Ser. No. 340,062
11 Claims. (Cl. 290—38)

This invention relates to timed starting devices for automobile or similar engines, and more particularly to an apparatus for automatically starting an automobile or other engine at a predetermined time, for example, to warm up the engine prior to actual use thereof.

A main object of the invention is to provide a novel and improved automatic starting device for automobile engines or similar engines adapted to start an engine at a predetermined preselected time for the purpose of warming up the engine prior to actual use thereof, the apparatus being simple in construction, being easy to operate, and being safe to use.

A further object of the invention is to provide an improved automatic starting apparatus for starting an automobile engine or similar engine prior to actual use and for warming up the engine for a predetermined period, the apparatus being especially useful for automatically starting an automobile engine at a predetermined time so as to allow the engine to warm up and to allow associated devices in the motor vehicle to be operated, such as the vehicle heating system, the apparatus involving relatively inexpensive parts, being easy to install, and being provided with selective means for automatically starting the engine a predetermined number of times.

A still further object of the invention is to provide an improved automatic engine starting system for starting an automobile engine or similar engine at a predetermined time to provide a preliminary warm-up period before the actual use of the engine, the system being provided with means for automatically attempting to start the engine sequentially a predetermined number of times, each starting time lasting for a definite period, and being arranged so that the starting system will become inoperative if the engine does not start during the aforesaid starting periods, whereby to prevent excessive drain of the storage battery associated with the engine.

A still further object of the invention is to provide an automatic starting device for starting an engine automatically at a preset time, the device being provided with safety means for preventing its operation unless the gear shift lever of the associated engine is in a neutral position.

A still further object of the invention is to provide an improved automatic starting device for starting an automobile engine or similar engine at a preset time and for allowing the engine to operate for a definite preliminary time period, after which the engine is automatically turned off.

A still further object of the invention is to provide an improved automatic starting device for starting an automobile engine or similar engine at a predetermined time in order to warm up the engine prior to its actual use, the device being provided with means for automatically attempting to start the engine a preset number of times, each attempt lasting for a predetermined duration, the device being further provided with means for automatically rendering same inoperative as soon as the engine starts.

Further objects and advantages of the invention will become apparent from the following description and claims, and from the accompanying drawings, wherein:

FIGURE 5 is a schematic wiring diagram showing the electrical connections of the starting device of FIGURES 1 to 4.

FIGURE 6 is an enlarged fragmentary plan view showing the accelerator pedal holding member as employed in the automatic starting system of FIGURES 1 to 5, said view being taken on the line 6—6 of FIGURE 1.

FIGURE 7 is a cross sectional view taken substantially on the line 7—7 of FIGURE 6.

FIGURE 8 is an enlarged fragmentary cross sectional detail view taken substantially on the line 8—8 of FIGURE 1, showing the safety switch controlled by the position of the gear shift lever of the automobile, and forming part of the automatic starting device of FIGURES 1 to 7.

FIGURE 9 is a cross sectional view taken substantially on the line 9—9 of FIGURE 8.

Figure 1:
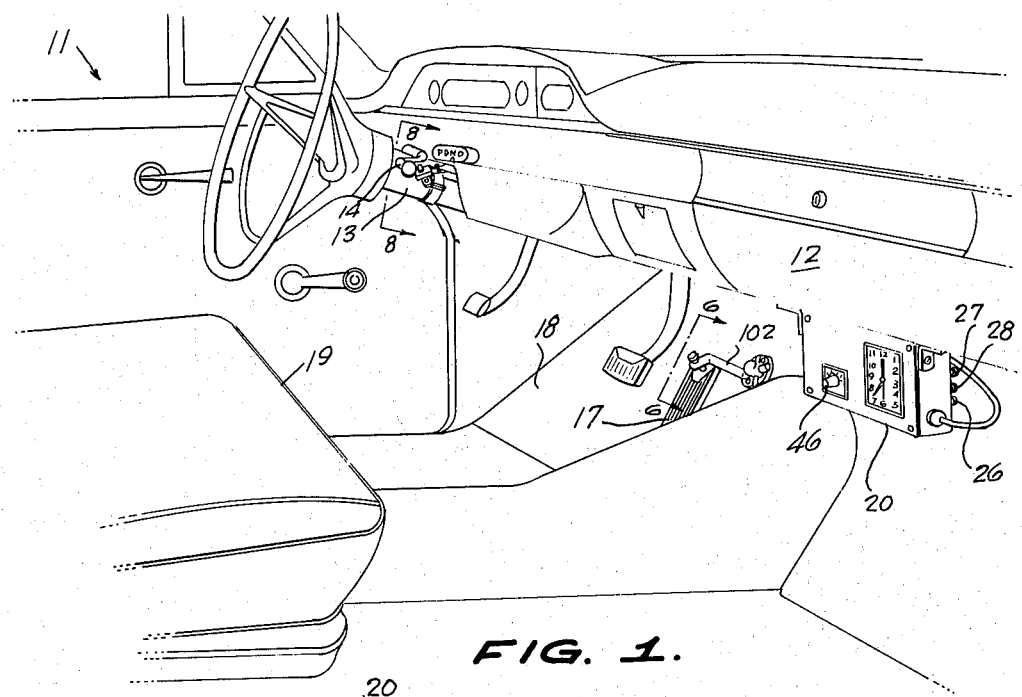
FIGURE 1 is a perspective view of an automobile dashboard and parts adjacent thereto showing the components of an automatic starting device according to the present invention installed in the automobile.
Figure 2:
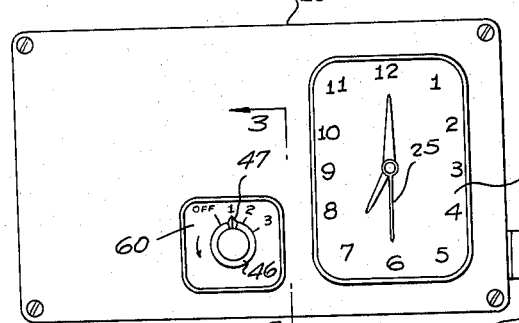
FIGURE 2 is an enlarged front elevational view showing the front panel of the timer and control unit housing, employed in the automatic starting system illustrated in FIGURE 1.

Referring to the drawings, 11 generally designates an automobile of conventional construction provided with the dashboard 12 and the steering post 13, said automobile being of the type having an automatic transmission of conventional construction including the gear shift lever 14 and the gear position indicator 15 located adjacent the steering column 13, the lever 14 being pivoted in a bracket 16 secured to the steering column 13.

The motor vehicle is provided with the conventional accelerator pedal 17 which is mounted on the inclined footboard 18.

Mounted in any convenient location adjacent to the automobile operator's seat 19, for example, secured to the underside of the dashboard 12, is a control housing 20 in which are mounted the main control elements of the automatic starting system of the present invention. One of these elements comprises a manually settable timer switch 21 of conventional construction, for example, similar to the timer switch disclosed in the United States patent to W. L. Sutton, No. 2,991,370. The timer unit 21 includes a conventional clock movement and is provided with a clock face, and further includes normally open switch contacts 22 and 23, one of the switch contacts 22 being operated by a timer cam 24 and being moved by the cam to engage the opposing contact 23 at a preset time, as established by the positioning of a selecting pointer 25. The pointer 25 is manually positioned, for example, by a suitable positioning mechanism controlled by a setting knob 26 projecting from the rear of the housing 20, as shown in FIGURE 1. The timer 21 is further provided with time-setting and winding knobs 27 and 28 also projecting from the rear of housing 20, as shown.

Figure 4:
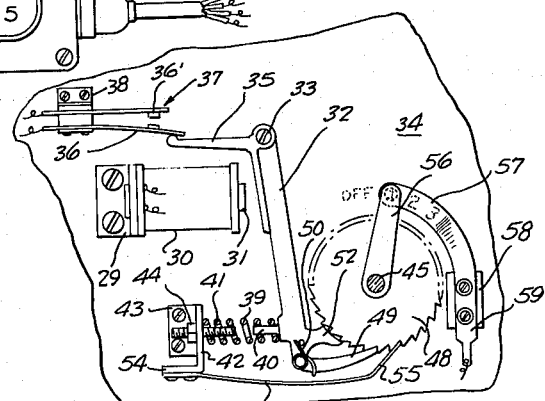
FIGURE 4 is a fragmentary elevational view taken substantially on the line 4—4 of FIGURE 3, showing the stepping solenoid and associated mechanism, as employed in the control unit of the automatic starting system of FIGURES 1 to 3.
Figure 3:
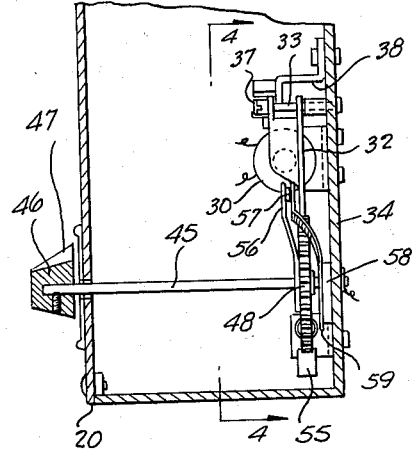
FIGURE 3 is an enlarged fragmentary vertical cross sectional view taken substantially on the line 3—3 of FIGURE 2.

Mounted in the housing 20, for example, on a bracket 29 is a stepping solenoid 30 provided with a magnetic core 31 positioned adjacent to a pivoted stepping lever 32, the lever being pivoted at 33, to the rear wall 34 of housing 20, as shown in FIGURES 3 and 4. Projecting substantially horizontally from the pivoted end of lever 32 is an arm 35 extending adjacent the leaf spring contact arm 36 of a stepping switch 37 mounted on a bracket 38 secured to rear wall 34, as shown in FIGURE 3, the switch 37 being normally open and closing when its spring contact arm 36 is engaged by the arm 35 responsive to clockwise rotation of the stepping lever 32 from the position thereof shown in FIGURE 4, namely, when the lever 32 is attracted by the core 31 of solenoid 30. The lever 32 is biased toward the position thereof shown in FIGURE 4, namely, away from the core 31, by a coiled spring 39 engaged at one end around a stud 40 projecting from the lower end portion of lever 32 and engaged at its other end around a stud 41 adjustably secured in the vertical flange 42 of an angle bracket 43 secured to wall 34. The stud 41 is substantially aligned with the stud 40, the stud 41 being threaded in the flange 42 and being adjustable therein to adjustably limit the clockwise rotation of the lever 32, the stop stud 41 being locked in adjusted position by means of a lock nut 44 threaded thereon and being lockingly engageable with the flange 42, as is clearly shown in FIGURE 4.

A transverse horizontal shaft 45 is rotatably mounted in the lower portion of housing 20, being provided at its outer forward end with an adjusting knob 46 having a pointer element 47. Mounted on the inner end portion of the shaft 45 is a ratchet disc 48 which is located adjacent the lever 32, the lever being provided with a pawl 49 pivoted thereto and biased into engagement with the teeth of the ratchet disc 48 by a biasing spring 50. As shown in FIGURE 4, the pawl 49 is arranged so that when the lever 32 rotates in a counterclockwise direction, as viewed in FIGURE 4, the pawl 49 acts against a tooth of the disc 48 to rotate the disc in a counterclockwise direction with the shaft 45, namely, through a predetermined angular step. The lever 32 is further provided with a guide arm 52 engageable with the toothed periphery of the disc 48 to limit the counterclockwise rotation of the lever 32. The disc 48 is restrained against clockwise rotation by the provision of a resilient spring arm 53 which is secured to a lug 54 on flange 52 and which extends into engagement with the toothed periphery of the disc 48, as shown in FIGURE 4, having a stop portion 55 which extends into engagement with the ratchet teeth and which allows only counterclockwise rotation of disc 48.

Secured rigidly to the shaft 45 is a contact arm 56 which is engageable with an arcuate fixed contact member 57 arranged concentrically with the shaft 45 and which is secured to but insulated from the wall 34 by a bracket 58 of insulating material which is secured to wall 34 and to which the terminal end portion 59 of the member 57 is fastened in any suitable manner.

By means of the knob 46, the arm 56 may be arranged to engage any one of several different points on the arcuate contact member 57, for example, three different points thereon, whereby after a corresponding number of steps of actuation of the solenoid 30, the arm 56 disengages from the arcuate member 57. The pointer 47 on the knob 46 may be positioned adjacent to any one of several indicia provided on a selecting control plate 60 mounted on the front wall of housing 20, so that the operator may preset the arm 56 to a position which will require a desired number of steps of operation of the solenoid 30 to open the switch defined by the cooperating members 56 and 57. As will be presently explained, the purpose of this arrangement is to enable the operator of a vehicle having a weak battery to limit the number of automatic starting attempts which will be provided by the starting system when said system goes into operation. With the arrangement illustrated in the drawings, the operator may pre-set the system to provide three or fewer starting attempts.

As will be seen from FIGURE 4, each time the solenoid 30 is energized, the lever 32 is retracted, namely, is moved clockwise until the lever 32 is engaged with and magnetically held firmly by core 31. Upon subsequent deenergization of the solenoid 30, the spring 39 moves the lever 32 counterclockwise, whereby the pivoted pawl 49 acts against a tooth of the ratchet disc 48, rotating the disc 48 counterclockwise through one step, namely, through the angle produced by the rotation of the lever 32 until arm 52 comes into engagement with the periphery of the disc 48. This rotates the contact arm 56 through a corresponding step, namely, moves the arm 56 in a counterclockwise direction from one position thereof to the next along the arcuate contact member 57. With each energization of solenoid 30, the clockwise movement of the lever 32 causes arm 35 to move the free end portion of spring contact arm 36 upwardly and to cause said spring contact arm 36 to engage the stationary contact 36' of switch 37. As will be presently explained, the switch 37 is connected in circuit with the motor vehicle starter solenoid in a manner to energize said starter solenoid responsive to the closing of the contacts 36, 36' of the switch 37.

Also mounted in the housing 20 is a conventional normally closed delay switch 62 having the normally closed switch contacts 63 and 64 and the heater coil 65 which is located adjacent the heat-responsive contact 63, which may be of bimetal material, or the like, whereby contact 63 disengages from contact 64 responsive to a predetermined period of energization of the heating coil 65. For example, the contact 63 will disengage from the contact 64 after ten seconds of energization of the heating coil 65. Subsequent to the deenergization of the heating coil 65 the contact 63 will return to re-engage the contact 64 after a sufficient time has passed to allow the arm 63 to cool down.

Also mounted in the control housing 20 are respective relays 66 and 67. The relay 66 is provided with three movable switch poles 68, 69 and 70 engageable with the respective stationary contacts 71, 72 and 73 responsive to the energization of the relay winding. The relay 67 is provided with a movable switch arm 74 which normally engages a stationary contact 75 but which disengages from said stationary contact responsive to the energization of the winding of the relay 67.

Secured to the steering column 13 adjacent to and behind the gear shift lever 14 is a bracket 76 on which is mounted a microswitch 77 having an operating plunger 78 engageable by the gear shift lever 14 when the lever is in its neutral position, as illustrated for example in FIGURE 8. The microswitch 77 has the contacts 78' and 79 which are normally disengaged from each other, the movable contact member 78' being moved into engagement with the stationary contact member 79 when the operating plunger 78 is engaged by the gear shift lever 14, namely, when the gear shift lever 14 is moved into its neutral position. Thus switch 77 will not be closed, namely, contact 78' will not engage contact 79, unless the gear shift lever 14 is in its neutral position.

As shown in FIGURE 5, the ungrounded terminal 80 of the motor vehicle battery 81 is connected through the switch 77 to a wire 82. Wire 82 is connected through the stepping switch 37 to the ungrounded terminal wire 83 leading to the starter solenoid. Wire 82 is also connected through the timer switch contacts 23 and 22 to a wire 84 connected to one of the terminals of the winding of relay 66. The other terminal of the winding of said relay is connected to a wire 85, which is in turn connected to the terminal end portion 59 of arcuate contact member 57. The contact arm 56 is connected to ground. It will thus be seen that with contacts 78' and 79 closed, the relay 66 becomes energized when the timer contacts 22 and 23 are closed by cam 24 through a circuit comprising battery wire 80, switch 77, wire 82, contacts 23 and 22, wire 84, the winding of relay 66, wire 85, arcuate contact member 57 and pole 56, assuming that the pole 56 is in conductive engagement with the arcuate contact member 57, as shown in FIGURE 5. The contact arm 22 will remain in its conductive engagement with the contact arm 23 for the dwell period of the timer 21, which is of the order of fifteen minutes.

The relay pole 68 is connected to wire 82 by a wire 86. Stationary contact 71 is connected by a wire 87 to relay pole 74. Stationary contact 75 of relay 67 is connected by a wire 88 to the stationary contact arm 64 of the slow-opening switch 62. The thermal contact arm 63 is connected by a wire 89 to one terminal of solenoid 30. The opposite terminal of the solenoid 30 is connected by a wire 90 to wire 85, namely, to ground through the arcuate contact member 57 and pole 56, with these elements in the positions shown in FIGURE 5. Therefore, the energization of relay 66 will energize solenoid 30 through a circuit comprising battery wire 80, switch 77, wire 82, wire 86, pole 68, contact 71, wire 87, pole 74, contact 75, wire 88, thermal switch contacts 64 and 63, wire 89, the winding of solenoid 30, wire 90, wire 85, contact member 57, pole 56 and ground. The heater winding 65 of the thermal switch 62 will likewise be energized in parallel with the winding of solenoid 30 through a branch circuit comprising wire 89, the heater winding 65, a wire 91 and a resistor 92. The branch circuit comprising the resistor 92 and the winding 65 are thus connected in parallel with the winding of solenoid 30, and the winding 65 becomes energized simultaneously with the energization of the solenoid, so that after a predetermined time period, for example, ten seconds, the heat from the winding 65 causes the thermal contact arm 63 to disengage from the stationary contact arm 64, opening the thermal switch 62. As previously mentioned, the energization of the solenoid 30 rotates the lever 32 in a clockwise direction, as viewed in FIGURE 4, and the subsequent deenergization of the solenoid 30, caused by the opening of contacts 63 and 64, causes the spring 39 to move the lever 32 in a counterclockwise direction, as viewed in FIGURE 4, advancing the ratchet wheel 48 through a counterclockwise step and moving the arm 56 in a counterclockwise direction along the arcuate contact member 57. The clockwise rotation of the lever 32 produced by the energization of the solenoid 30 closes the stepping switch 37, in the manner above described, namely, by the action of arm 35, energizing the starter solenoid of the motor vehicle. The starter solenoid remains energized for the period during which the contacts 63 and 64 remain closed, for example, for the period of ten seconds, required for the opening of the thermal switch 62. Therefore, the vehicle engine will be cranked for a period of ten seconds, or the like, as soon as the timer contacts 22 and 23 close, assuming relay 67 remains deenergized.

One terminal of the winding of relay 67 is connected through wires 94 and 95 and a resistor 96 to a wire 97 leading to the ungrounded terminal of the field winding of the generator of the vehicle. The other terminal of the winding of relay 67 is connected by a wire 98 to the relay contact 72. Thus relay 67 will become energized simultaneously with the energization of the field winding of the vehicle generator, namely, when the engine starts, causing the armature 74 to disengage from the contact 75 and thereby render the automatic starting circuit inoperative.

The relay contact 73 is connected by a wire 99 to the battery terminal of the vehicle ignition coil, so that the ignition coil becomes energized responsive to the energization of relay 66 through a circuit comprising battery wire 80, switch 77, wire 82, a wire 100 connecting wire 82 to the relay armature 70, contact 73, wire 99, and the winding of the ignition coil. Thus, when the timer contacts 22 and 23 close, the ignition coil is energized by the closure of relay contacts 70, 73, and the starter solenoid is energized by the closure of the stepping switch 37. If the engine fails to start on the first attempt, another attempt will be initiated, assuming that pole 56 remains in contact with the arcuate contact member 57, after coil 65 cools down sufficiently to allow thermal arm 63 to reengage arm 64. The second starting attempt will last for the same period as the first attempt, namely, approximately ten seconds, and there will be another starting attempt, assuming that arm 56 still remains in contact with the arcuate contact member 57. If the engine fails to start on the third attempt, the arm 56 is stepped away from the end of the arcuate contact 57, and no further attempt will be made. It will therefore be necessary to start the engine by conventional means.

As above explained, if the engine starts during one of the starting attempts provided by the sequential energization of the solenoid 30, the associated generator field becomes energized, thereby causing relay 67 to be energized and to move its armature 74 away from contact 75. This opens the energizing circuit associated with the solenoid 30, so that no further energization of the solenoid can take place. The engine will continue to operate for the period of dwell of the cam 24, for example, for a period of about fifteen minutes, during which the contact 22 is held in engagement with the contact 23. After the dwell period the contacts 22 and 23 open. However, the fifteen minute dwell period is sufficient to allow the engine to be properly warmed up, and also to allow the interior of the vehicle to be heated by its heater, assuming that the heater control means has been placed in operating position prior to the setting of the timer 21.

The accelerator pedal 17 is placed in a slightly depressed position to prepare the vehicle for automatic starting, by the provision of manually settable hold-down means comprising a rotatable arm 102 having a horizontal foot portion 103 which is pivotally connected to a base disc 104 secured to the floor board 18 adjacent the pedal 17. The disc 104 is provided with radial grooves 105 spaced 90° apart and adapted to receive the horizontal base portion 103 of arm 102 in either of two positions, namely, either an inoperative position wherein the foot portion 103 is disposed parallel to the accelerator pedal 17 or in an alternate position wherein the foot portion 103 is arranged substantially perpendicular to the accelerator pedal 17, as shown in FIGURE 6. A pivot bolt 105' extends through the foot portion 103 and is provided with a bearing washer 106 under its head. A coiled spring 107 surrounds the bolt 105', bearing between the washer 106 and a bottom washer 108 resting on foot portion 103, thereby biasing the foot portion 103 to lockingly engage in a pair of diametrically arranged radial grooves 105. Bolt 105' and the spring 107 are protectively housed in a cap member 110 overlying same and secured on the foot portion 103.

The inclined arm 102 is provided with a substantially horizontal top portion 111 arranged to overlie the pedal 17 when the member 102 is in its transverse position, shown in FIGURES 6 and 7. A vertical, adjustable stop bolt 112 is threadedly engaged through the horizontal top arm 111 in a position to engage the accelerator pedal 17, as shown in FIGURE 7, the bolt 112 being locked in adjusted position by means of a lock nut 113. The bolt 112 may be adjusted to a position to hold the pedal 17 depressed sufficiently to insure idling of the engine upon starting thereof. When not in use, the arm 102 is turned to its inoperative position, namely, the position wherein it is held in the retaining grooves 105 located parallel to the accelerator pedal 17.

In setting the apparatus, the timer 21 is first set so that its timing pointer 25 points to the time at which it is desired to start the engine. The attempt-selecting control knob 46 is then adjusted so that its pointer 47 indicates the number of attempts which it is desired to provide in starting the engine, this number depending upon the condition of the vehicle battery. If the battery is weak, it may be desired to provide only one or two starting attempts. If the battery is in good condition, the pointer 47 may be set to provide three starting attempts. The gear shift lever 14 must be placed in neutral position, and the arm 102 is then rotated to its transverse position, namely, with the top portion 111 transversely overlying the accelerator pedal 17 and with the stop bolt 112 engaging the accelerator pedal to hold it slightly depressed. With the parts thus arranged, the circuit of the system will then be as illustrated in FIGURE 5, wherein it will be seen that switch 77 is closed and that the relays 66 and 67, as well as the solenoid 30 are deenergized. In FIGURE 5 the arrangement is such that the pole 56 is set to a position wherein only one starting attempt will be provided.

As above explained, the starting attempt will occur when the timer contacts 22 and 23 close, namely, at the predetermined time selected by the setting of the timer pointer 25.

The resistors 92 and 96 are included to adapt the system for twelve-volt operation. For six-volt operation, the resistors 92 and 96 may be omitted.

While a specific embodiment of an improved automatic starting system for a motor vehicle engine or other engine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding, a source of current, means to connect said operating winding to said source of current responsive to closure of said time-controlled switch, and circuit means connecting said solenoid to said source of current through said time-controlled switch and said delay switch.

2. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding, and with means to reclose same subsequent to opening thereof, a source of current, means to connect said operating winding to said source of current responsive to closure of said time-controlled switch, and circuit means connecting said solenoid to said source of current through said time-controlled switch and said delay switch, whereby to provide successive periods of energization of the solenoid responsive to closure of the time-controlled switch and thereby to provide successive periods of closure of said starting switch.

3. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding, and with means to reclose same subsequent to opening thereof, a source of current, means to connect said operating winding to said source of current responsive to closure of said time-controlled switch, circuit means connecting said solenoid to said source of current through said time-controlled switch and said delay switch, whereby to provide successive periods of energization of the solenoid responsive to closure of the time-controlled switch and thereby to provide successive periods of closure of said starting switch, and means to open said circuit means after a predetermined number of periods of energization of the solenoid.

4. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding, and with means to reclose same subsequent to opening thereof, a source of current, means to connect said operating winding to said source of current responsive to closure of said time-controlled switch, circuit means connecting said solenoid to said source of current through said time-controlled switch and said delay switch, whereby to provide successive periods of energization of the solenoid responsive to closure of the time-controlled switch and thereby to provide successive periods of closure of said starting switch, said circuit means including adjustable further switch means, and means to open said further switch means responsive to a predetermined number of successive periods of energization of the solenoid.

5. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said time-controlled switch and said delay switch, whereby to provide successive periods of energization of the solenoid responsive to closure of said time-controlled switch and thereby to provide successive periods of closure of said starting switch, said circuit means including further switch means comprising a stationary contact member, a manually adjustable movable contact member slidably engaged with said stationary contact member, and means to disengage said movable contact member from said stationary contact member responsive to a predetermined number of succesive periods of energization of the solenoid.

6. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said time-controlled switch and said delay switch, whereby to provide successive periods of energization of the solenoid responsive to closure of the time-controlled switch and thereby to provide successive periods of closure of said starting switch, said circuit means including further switch means comprising a stationary contact member, a manually adjustable rotatable contact member slidably engaged with said stationary contact member, and means to rotate said rotatable contact member to a position disengaged from said stationary contact member responsive to a predetermined number of successive periods of energization of the solenoid.

7. In an automatic engine starting system, a starting switch, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said time-controlled switch and said delay switch, said circuit means including further switch means comprising a stationary contact member, a manually adjustable rotatable contact member slidably engaged with said stationary contact member, a ratchet wheel connected coaxially with said rotatable contact member, and pawl means on a movable armature engaging the periphery of the ratchet wheel, the stationary contact member being limited in circumferential length, whereby to disengage said rotatable contact member from said stationary contact member responsive to a predetermined number of successive periods of energization of the solenoid.

8. In an automatic engine starting system, a starting switch, a solenoid provided with a movable armature, means on said armature operatively engageable with said starting switch to close same responsive to each energization of the solenoid, means biasing the armature away from switch-closing position, a gear shift lever, a safety switch, means to close said safety switch only when said gear shift lever is in a neutral position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said time-controlled switch, said safety switch, and said delay switch, whereby to provide successive periods of energization of the solenoid responsive to closure of the time-controlled switch with the gear shift lever in said neutral position, and thereby to provide successive periods of closure of said starting switch.

9. In an automatic engine starting system, a starting switch, a solenoid provided with a movable armature, means on said armature operatively engageable with said starting switch to close same responsive to each energization of the solenoid, means biasing the armature away from switch-closing position, a gear shift lever, a safety switch, means to close said safety switch only when said gear shift lever is in a neutral position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said time-controlled switch, safety switch, and said delay switch, whereby to provide successive periods of energization of the solenoid responsive to closure of the time-controlled switch with the gear shift lever in said neutral position, and thereby to provide successive periods of closure of said starting switch, said circuit means including adjustable further switch means, and means to open said last-named switch means responsive to a predetermined number of successive periods of energization of the solenoid.

10. In an automatic engine starting system, a starting switch, an engine-driven generator, switch means opening responsive to operation of said engine-driven generator, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said first-named switch means, said time-controlled switch, and said delay switch, whereby to provide successive periods of energization of the solenoid responsive to closure of the time-controlled switch and thereby to provide successive periods of closure of said starting switch until said engine-driven generator begins to operate.

11. In an automatic engine starting system, a starting switch, an engine-driven generator, switch means opening responsive to operation of said engine-driven generator, a solenoid provided with a movable armature, means on said armature operatively engageable with said starting switch to close same responsive to each energization of the solenoid, means biasing the armature away from switch-closing position, a time-controlled switch, a normally closed delay switch provided with an operating winding and means to open the delay switch after a predetermined period of energization of said operating winding and with means to reclose same subsequent to opening thereof, a source of current, means to connect said operating winding to said source of current responsive to closure of said time-controlled switch, and circuit means connecting said solenoid to said source of current through said first-named switch means, said time-controlled switch, and said delay switch, whereby to provide successive periods of energization of the solenoid responsive to closure of the time controlled switch and thereby to provide successive periods of closure of said starting switch until said engine-driven generator begins to operate, said circuit means including adjustable further switch means, and means to open said last-named switch means responsive to a predetermined number of successive periods of energization of the solenoid.

References Cited by the Examiner

UNITED STATES PATENTS

| | | |
|---|---|---|
| 2,374,251 | 4/1945 | Wallace. |
| 2,710,926 | 6/1955 | Charles. |
| 2,748,759 | 6/1956 | Schiffer. |
| 2,836,732 | 5/1958 | Newlin _____ 290—38 |
| 2,975,296 | 3/1961 | Dominguez-Rego. |
| 2,992,335 | 7/1961 | Boucher. |
| 3,009,067 | 11/1961 | Janeczko et al. |
| 3,154,689 | 10/1964 | Bubbenmoyer _____ 290—38 |

ORIS L. RADER, *Primary Examiner.*

G. SIMMONS, *Assistant Examiner.*